United States Patent
Stolzer et al.

(10) Patent No.: US 9,546,042 B2
(45) Date of Patent: Jan. 17, 2017

(54) RACK STORAGE SYSTEM AND METHOD FOR CONTROLLING THE MOVEMENT PATH OF A STORAGE AND RETRIEVAL DEVICE IN A RACK STORAGE SYSTEM

(71) Applicant: KEURO Besitz GmbH & Co. EDV-Dienstleistungs KG, Achern (DE)

(72) Inventors: Armin Stolzer, Baden-Baden (DE); Christoph Mutschler, Herbolzheim (DE)

(73) Assignee: KEURO Besitz GmbH & Co. EDV-Dienstleistungs KG, Achern (DE)

( * ) Notice: Subject to any disclaimer, the term of this patent is extended or adjusted under 35 U.S.C. 154(b) by 0 days.

(21) Appl. No.: 14/879,602

(22) Filed: Oct. 9, 2015

(65) Prior Publication Data

US 2016/0101938 A1   Apr. 14, 2016

(30) Foreign Application Priority Data

Oct. 9, 2014  (DE) ........................ 10 2014 114 703

(51) Int. Cl.
    *G06F 7/00*     (2006.01)
    *B65G 1/137*     (2006.01)
    *B65G 1/04*     (2006.01)

(52) U.S. Cl.
    CPC ............. *B65G 1/137* (2013.01); *B65G 1/0421* (2013.01)

(58) Field of Classification Search
None
See application file for complete search history.

(56) References Cited

U.S. PATENT DOCUMENTS 8,400,098 B2 * 3/2013 Ewert ...................... H02P 5/46
318/625

FOREIGN PATENT DOCUMENTS

DE      102012006163      10/2013
JP      2004123350      4/2004
(Continued)

OTHER PUBLICATIONS

Hull, Daryl, "Search for a Green Automated Warehouse" The Mheda Jounal, Jul. 22, 2011, http://www.themhedajournal.org/2011/07/22/searching-for-a-green-automated-warehouse, retrieved May 25, 2016.

*Primary Examiner* — Yolanda Cumbess
(74) *Attorney, Agent, or Firm* — Volpe and Koenig, P.C.

(57) ABSTRACT

A rack storage system 1 and a method for controlling the movement path of a storage and retrieval device in a rack storage system, including at least one storage and retrieval device with at least two movement axes x, y which can be controlled independently of one another and are operated by electric motors, to carry out a movement from a starting point to a target point 4 to transfer stored goods within the rack storage system and/or into or out of the rack storage system, having a control unit for controlling the motors of the movement axes x, y and an electric intermediate circuit for exchanging fed-back electrical energy between the motors. The control unit pre-calculates the movement sequences, necessary for a movement from the starting point to the target point, of the individual movement axes x, y and coordinates them with one another, and actuates the motors of the movement axes x, y so the storage and retrieval device carries out the movement on a pre-calculated movement path which is based on a set of movement sequences, coordinated with one another, of the individual movement axes x, y. The control unit calculates a quantity with a plurality of sets of movement sequences which are coordi- (Continued)

nated with one another, which contains at least a first set with movement sequences which are optimized with respect to the speed of the movement, for a high-speed operating mode, and a second set with movement sequences which are optimized with respect to the consumption of electrical energy, for an economical operating mode. The control unit selects a set with movement sequences from the calculated quantity on the basis of operation parameters of the rack storage system in order to actuate the motors of the movement axes in order to carry out a movement path.

22 Claims, 4 Drawing Sheets

(56) References Cited

FOREIGN PATENT DOCUMENTS

| | | |
|---|---|---|
| JP | 2012076857 | 4/2012 |
| JP | 2012076858 | 4/2012 |
| JP | 2012076859 | 4/2012 |
| WO | 2008025499 | 3/2008 |
| WO | 2008117248 | 10/2008 |
| WO | 2011066856 | 6/2011 |

* cited by examiner

RACK STORAGE SYSTEM AND METHOD FOR CONTROLLING THE MOVEMENT PATH OF A STORAGE AND RETRIEVAL DEVICE IN A RACK STORAGE SYSTEM

INCORPORATION BY REFERENCE

The following documents are incorporated herein by reference as if fully set forth: German Patent Application No. 102014114703.0, filed Oct. 9, 2014.

BACKGROUND

The invention relates to a rack storage system with at least one storage and retrieval device, and to a method for controlling the movement path of a storage and retrieval device in a rack storage system.

Such a rack storage system accordingly comprises at least one storage and retrieval device with at least two movement axes which can be controlled independently of one another and are operated by means of electric motors, in order to carry out a movement from a starting point to a target point in order to transfer stored goods within the rack storage system and/or into or out of the rack storage system. Furthermore, an electric intermediate circuit for exchanging fed-back electrical energy is provided between the motors. By means of said intermediate circuit it is possible for the electrical energy which is fed back during braking of a movement axis by a generator-operating mode of the corresponding motor to be made available for consumption to the other motors. Finally, a control unit for controlling the motors of the movement axes of the storage and retrieval device is provided. This control unit pre-calculates the movement sequences, necessary for a movement from the starting point to the target point, of the individual movement axes, and coordinates them with one another. The motors of the movement axes are then actuated by the control unit in such a way that the storage and retrieval device carries out the movement on a pre-calculated movement path which is based on a set of movement sequences, coordinated with one another, of the individual movement axes.

The control unit just mentioned therefore implements a method of the type in question here. This is because in said method the movement sequences of the individual movement axes, which sequences are necessary for a movement of a storage and retrieval device with at least two movement axes which can be controlled independently of one another and are operated by means of electric motors, from a starting point to a target point, are pre-calculated and coordinated with one another. The motors of the movement axes are actuated in such a way that the storage and retrieval device carries out the movement on a pre-calculated movement path which is based on a set of movement sequences, coordinated with one another, of the individual movement axes.

Rack storage systems of the type in question here generally comprise a plurality of storage and retrieval devices which are each arranged so as to be movable in a rack aisle and can access each storage compartment of the rack aisle. As a result, automatic storage can be implemented in which, in particular, heavy stored goods, which cannot be moved manually, are stored. This rack storage system is particularly suitable for stored goods which must be accessed repeatedly, as is the case, for example, in the metal retail business. Stored metal rods, profiles and the like are kept available here in the rack storage system, in order to be removed, after the receipt of an order, from the rack storage system and fed, for example, to a sawing machine where the ordered quantity of the material is cut to length and put together with other ordered material. Residual pieces which remain after the cutting to length are then returned to storage in the rack storage system.

Such a rack storage system is operated with a central control system which actuates the individual storage and retrieval devices, with the result that existing orders are successively processed. For example, for one order it is necessary to extract a metal rod from a first storage compartment of a first rack aisle, to feed said metal rod to a sawing machine which is arranged in front of the rack aisle, to saw off a piece of the rod there and to return the rest of the rod back to storage, while a profile has to be extracted from a second storage compartment of another rack aisle and fed to the same sawing machine, in order also to saw off a piece from this profile and so on until the order is processed and the sawn-off pieces are put together in one order.

It is obvious that the rack storage system is more efficient the quicker the storage and retrieval device carries out the necessary movements from the starting point, for example the storage compartment, to the target point, for example a transfer point to the sawing machine. Therefore, in the prior art it has always been customary to actuate the motors of the individual movement axes of the storage and retrieval devices in each case at the maximum speed and with the maximum accelerations in order to carry out the movement as quickly as possible. However, this is not optimum under cost aspects, since the consumption of electrical energy with this procedure is also at a maximum. The simultaneous maximum acceleration of all the movement axes also causes disadvantageous peaks in the power consumption of the rack storage system.

WO-A-2008/025499 has therefore proposed that the control unit of a rack storage system of the type in question here be configured in such a way that for a movement of a storage and retrieval device from a starting point to a target point it firstly determines the time-critical movement axis, that is to say that movement axis, which, given a maximum speed of all the motors of the storage and retrieval device, requires the longest time for the necessary movement sequence. This would generally be that movement axis which has to travel the greatest distance; however, it can also be the slowest movement axis. This time-critical movement axis is actuated by the control unit with a maximum speed movement sequence, that is to say with a maximum speed of the associated motor and maximum accelerations. The remaining movement axes are controlled in a way which is optimized with respect to energy compared to the time-critical movement axis, with the result that the motors of the individual movement axes can mutually make available a maximum amount of braking energy. This means, in particular, that acceleration processes of the motors of the non-time-critical movement axes are preferably provided when electrical energy is fed back from the motor of the time-critical movement axis.

The prior art according to WO-A-2008/117248 therefore permits operation of a rack storage system whose requirement for electrical energy is advantageously reduced without adversely affecting the efficiency of the rack storage system, since the individual movements of the storage and retrieval devices are not slowed down overall compared to the practice hitherto.

SUMMARY

Taking this prior art as a basis, the present invention is based on the object of further improving a rack storage system and a method of the type mentioned at the beginning with respect to the requirement of energy.

This object is achieved by a rack storage system and by a method having one or more features of the invention. Advantageous developments of the rack storage system according to the invention as well as preferred refinements of the method according to the invention are disclosed below and in the claims.

The method according to the invention is accordingly defined in that not only one set of movement sequences which are coordinated with one another is produced but rather a quantity with a plurality of sets of movement sequences which are coordinated with one another is calculated. This quantity contains at least a first set with movement sequences which are optimized with respect to the speed of the movement, for a high-speed operating mode, and a second set with movement sequences which are optimized or at least partially optimized with respect to the consumption of electrical energy, for an economical operating mode. A set with movement sequences from the calculated quantity is then selected on the basis of operation parameters of the rack storage system in order to actuate the motors of the movement axes of the storage and retrieval device in order to carry out a movement path.

A main criterion for the selection of a movement sequence set is the time available for a movement from the starting point to the target point. This is because if more time is available than the storage and retrieval device requires in the high-speed operating mode for the movement from the starting point to the target point, a movement sequence set can be selected with which the motors of the storage and retrieval device consume less electrical energy and/or with which the wear of the motors is reduced. This can be a movement sequence set with relatively slow accelerations, or else it can be the movement sequence set for the economical operating mode. At any rate, this measure according to the invention provides a saving with respect to electrical energy during the operation of the rack storage system, without adversely affecting the power which is required at that time for the rack storage system.

The rack storage system according to the invention has been improved compared to the prior art in that the control unit implements the method according to the invention, that is to say it calculates a quantity with a plurality of sets of movement sequences which are coordinated with one another, wherein this quantity contains at least a first set with movement sequences which are optimized with respect to the speed of the movement, for a high-speed operating mode, and a second set with movement sequences which are optimized or at least partially optimized with respect to the consumption of electrical energy, for an economical operating mode. The control unit then selects a set with movement sequences from the calculated quantity on the basis of operation parameters of the rack storage system, in particular on the basis of the time which is available for a movement, in order to actuate the motors of the movement axes in order to carry out a movement path.

The time which is available for carrying out a movement of the storage and retrieval device can depend on various operation parameters of the rack storage system. This can be, for example, the instantaneous capacity utilization of the rack storage system, which capacity utilization depends on the quantity and the sequence of the orders to be processed. If the quantity of the orders to be processed within one time unit, for example within one day, does not require the full efficiency of the rack storage system but instead all the orders can also be processed relatively slowly and nevertheless all the orders are processed at the end of the day, energy-optimized movement sequence sets can be selected. Likewise, there is more time available for a movement if, for example, two storage and retrieval devices in different rack aisles are working toward a common target point, which point can only be operated by them in succession. In this case, it may be appropriate to operate one of the two storage and retrieval devices in an energy-optimized fashion or in the low-wear operating mode according to the invention. A further example of the way in which the invention can be applied is the cooperation of a rack storage system with, for example, a sawing machine, in the case of which it is not appropriate to supply material to be sawed as long as the previous sawing process has not yet been concluded. In this case, a storage and retrieval device can, according to the invention, be operated in the economical operating mode, since no time advantage would be achieved with the high-speed operating mode because the stored goods would arrive too early at the sawing machine.

As a refinement of the procedure according to the invention, the control unit of the storage and retrieval device can weigh up, on the basis of appropriate algorithms, how much of a time saving in the high-speed operating mode can be made as against the amount of energy which can be saved in the economical operating mode or some other, if appropriate, partially energy-optimized movement sequence set, and can then decide which movement sequence set is used for the execution of the movement, on the basis of predefined threshold values. This is because often a slight delay, which is hardly significant with respect to the additional expenditure of time, can bring about a significant saving in energy. An example of this is a two-dimensional movement from a high storage location as a starting point to a target point in the region of the floor, spaced apart a long way from the storage location in the horizontal direction: the horizontal movement would in this case be the time-critical movement axis which, in the high-speed operating mode, has to be actuated with a maximum speed movement sequence. This means that the corresponding motor is operated with full acceleration from the start of the movement. However, if the acceleration of this motor is delayed and if the stored goods are initially lowered by a small amount, the motor for the horizontal movement axis can use for the acceleration electrical energy which has been fed back from the motor for the vertical movement axis, which brings about a significant saving in energy. The delay could be negligible with respect to this.

The set which is calculated according to the invention with movement sequences which are optimized with respect to the speed of the movement preferably contains a maximum speed movement sequence for the time-critical movement axis, i.e. for that movement axis which, given a maximum speed of all the motors of the storage and retrieval device, requires the most time for the necessary movement sequence for a specific movement from the starting point to the target point. The remaining movement axes of the storage and retrieval device can then be actuated with coordinated movement sequences which as a result give rise to an essentially shortest possible movement path. This, of course, optimizes the energy consumption of the remaining movement axes, without adversely affecting the maximum speed for the movement in any way.

Alternatively, for the remaining movement axes of the storage and retrieval device it is possible to calculate movement sequences which end before, or at the same time as, the movement sequence of the time-critical movement axis, in order to avoid adversely affecting the maximum speed, but with which movement sequences the correspondingly actuated motors require as little electrical energy as possible or are operated with as little wear as possible. This is an optimization question and can include, for example, in the case of a storage and retrieval device with two movement axes, actuating the non-time-critical movement axis with the lowest possible acceleration values in order to consume as little electrical energy as possible, or to minimize the wear of the involved motors and other moving parts.

A further alternative is to control the remaining movement axes with movement sequences which end before, or at the same time as, the movement sequence of the time-critical movement axis, and in which acceleration processes of the associated motors are preferably provided when electrical energy is fed back into the intermediate circuit from motors of other movement axes, in particular from the motor of the time-critical movement axis. This is also an optimization question which can be performed by the control unit on the basis of software. Of course, the energy requirement drops significantly if a motor of a storage and retrieval device can use the fed-back braking energy of another motor to start up.

In terms of the movement sequence set for the economical operating mode, that is to say the set with movement sequences which are optimized with respect to the consumption of electrical energy, within the scope of the present invention it is preferred to determine this set in such a way that acceleration processes of the motors which are assigned to the movement axes are preferably provided when electrical energy is fed back into the intermediate circuit from motors of other movement axes. However, within the scope of the present invention, other movement sequences and movement sequence combinations which are optimized with respect to the consumption of electrical energy can also be used.

According to the invention, the instantaneous capacity utilization of the rack storage system is preferably taken into account in the selection of a set with movement sequences. For this purpose, the instantaneous system state of the rack storage system is preferably also taken into account, in particular whether stored goods which are transferred with the storage and retrieval device which is to be moved are to be passed on to a further handling system, and when this further handling system is ready to pick up the stored goods. As already mentioned, this further handling system can be, for example, a feed unit for a sawing machine or the like.

In addition to the movement sequence set for a high-speed operating mode and the movement sequence set for an economical operating mode as well as, if appropriate, further movement sequence sets, within the scope of the present invention it is preferred if a further set is calculated with movement sequences which are optimized with respect to the wear of the storage and retrieval device and its motors, for a low-wear operating mode. This is because even when a movement which provides only very little potential for saving electrical energy has to be carried out, but sufficient time is available to not travel in the high-speed operating mode, advantages with respect to the service life of all the involved moving parts are obtained by a low-wear operating mode of the storage and retrieval device and its motors.

Within the scope of the present invention, a delay which is pre-selectable and/or determined by means of a prediction algorithm can be taken into account in the selection of a set with movement sequences. Depending on an operator's experience or a calculated prediction, a delay can be pre-selected which firstly adversely affects the efficiency of the rack storage system, since the individual orders require a correspondingly longer time. However, this can be averaged out over, for example, a day through fluctuations in the orders, with the result that the rack storage system has nevertheless overall still achieved the same efficiency at the end of the day with the pre-selected delay as it would have done with movement sequences without a delay, which were carried out, under certain circumstances, more frequently as a high-speed operating mode because of a number of order volume peaks distributed over the day. Overall, according to the invention this results in the saving of electrical energy and/or a lower-wear operation of the rack storage system.

The specified delay is taken into account here in such a way that a set with movement sequences which are optimized with respect to the speed of the movement, for a high-speed operating mode, is pre-calculated in such a way that for the time-critical axis a movement sequence is calculated which is slower than the maximum speed movement sequence by up to the value of the delay, and/or is started later by up to the value of the delay, depending on the saving on electrical energy which can be achieved hereby or the reduction in the wear of the storage and retrieval device and its motors which can be achieved hereby.

Within the scope of the present invention it is also preferred if the storage and retrieval device or a plurality of storage and retrieval devices rearrange stored goods in operational pauses or operational interruptions, for example by means of a central storage administration computer, as a function of orders which have already been received or as a function of predictions relating to future capacity utilization of the rack storage system, in order to optimize the transportation paths of the rearranged stored goods with respect to expected movement sequences for a high-speed operating mode.

In this context it is advantageous if the requirement of electrical energy which is additionally incurred for the rearrangement of the stored goods is calculated for said rearrangement. At the same time, the possible savings in electrical energy which are made possible by the rearrangement of the stored goods are then estimated by means of a prediction about the number of movement sequences which are probably to be carried out in the high-speed operating mode. Balancing of the calculated additional requirement against the estimated possible savings then gives rise to a result with which rearrangement of the stored goods is initiated or such rearrangement is suppressed.

The predictions for the rearrangement and also for the probably tolerable delay and for the possible savings in electrical energy are made by means of statistical evaluations of capacity utilizations of the rack storage system in the past, or a comparable rack storage system, or by prediction scenarios, available in specialist publications, relating to the capacity utilization of relevant rack storage systems, as a function of, for example, the day of the week, the time of year, and public holiday situations. Information from other departments of a company which operates the rack storage system according to the invention can also be included in the prediction, such as, for example, contractual agreements, strategic re-orientations, discussions and knowledge from specialist trade fairs and the like which influence the expected future orders which are to be processed in the rack storage system.

BRIEF DESCRIPTION OF THE DRAWINGS

A simplified exemplary embodiment of the procedure according to the invention will be described with reference to the appended drawings, in which.

DETAILED DESCRIPTION OF THE PREFERRED EMBODIMENTS

Figure 1:
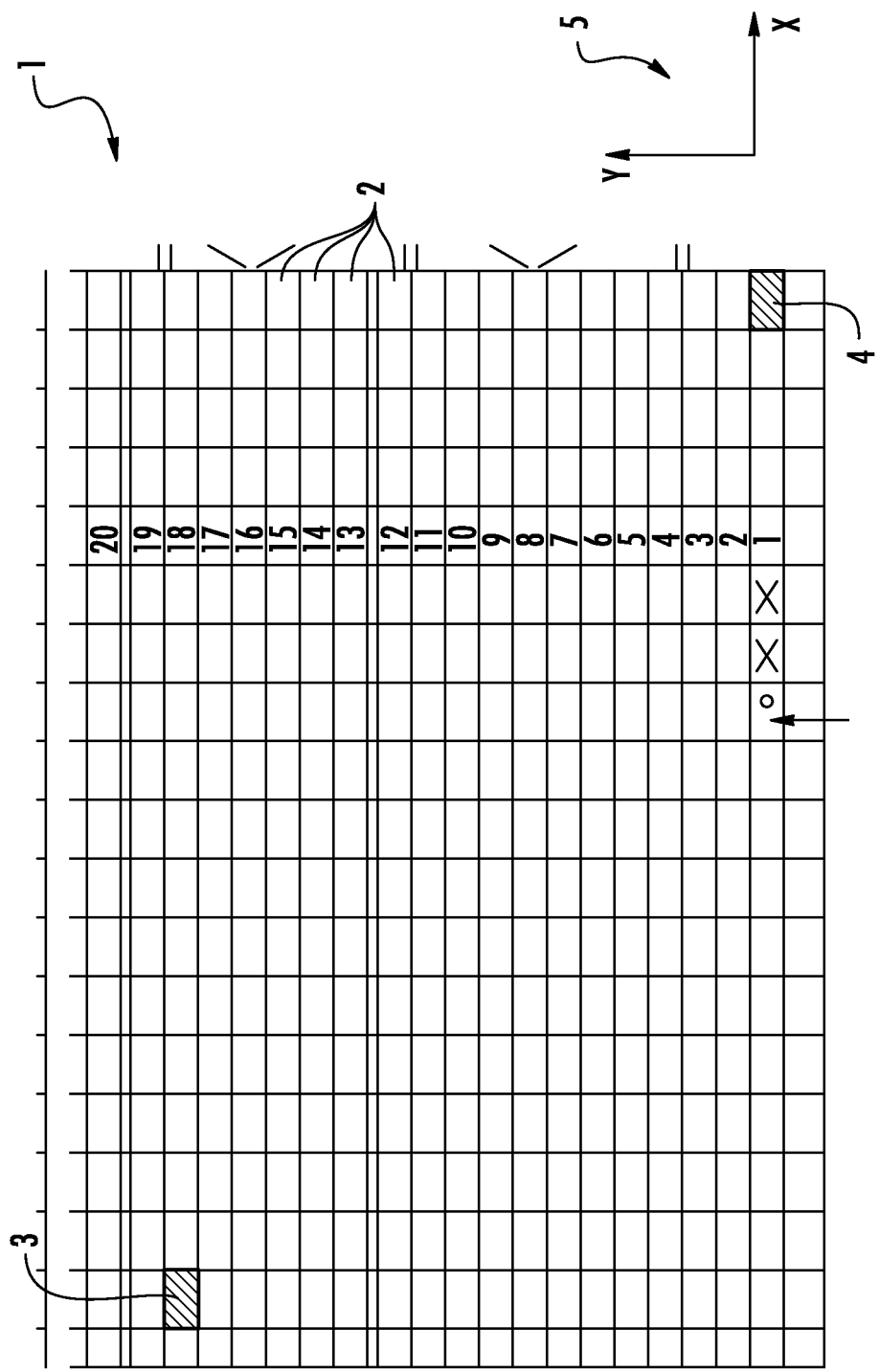
FIG. 1 shows a schematic view of a rack storage system with a starting point and a target point.

The rack storage system 1 which is illustrated schematically in FIG. 1 is comprised of a multiplicity of storage compartments 2 in which stored goods, such as, for example, pallets with metal profiles, are stored. A storage and retrieval device (not illustrated) with two movement axes 5, a horizontal movement axis x and a vertical movement axis y is capable of moving to each of the storage compartments 2 and extracting the pallets from the storage compartments 2 or placing them therein. For this purpose, said storage and retrieval device comprises, in a manner known per se, a lifting mechanism for the vertical movement (movement axis y) and a driving mechanism for the horizontal movement (movement axis x) with which it can be moved on a rail (not illustrated either) provided along the rack storage system 1.

The object which is provided for the present exemplary embodiment is to transfer a pallet which has been extracted from a storage compartment 2 at a starting point 3, from this starting point 3 to a target point 4, in order to transfer it there to a further handling system (not illustrated) which extracts profiles from the pallet and feeds them to a sawing machine (likewise not illustrated).

Figure 2:
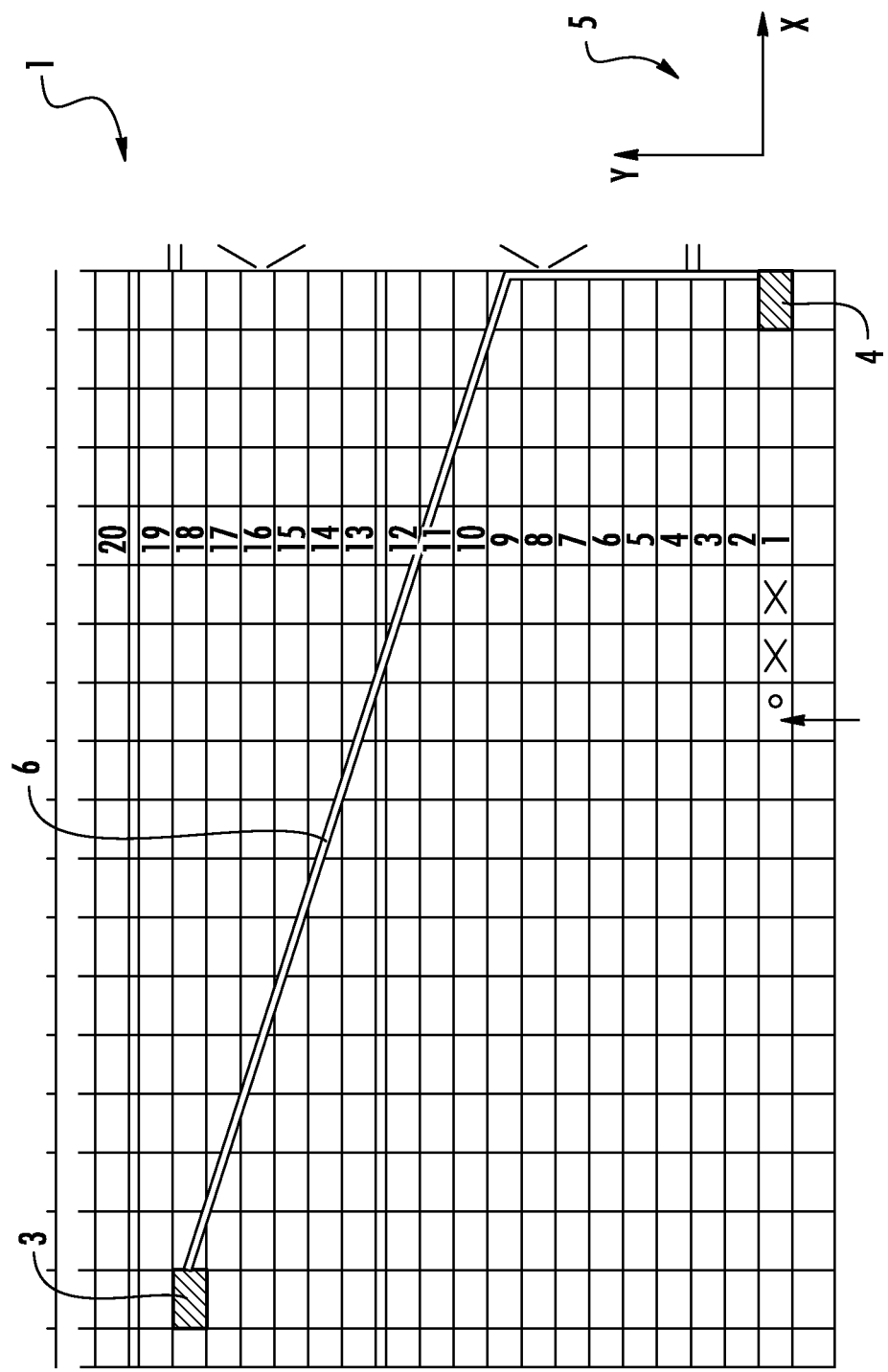
FIG. 2 shows a schematic illustration of a rack storage system with a first movement path.

FIG. 2 shows a first possible movement path 6 from the starting point 3 to the target point 4. The movement path 6 corresponds to the conventional procedure and results from the fact that the motors of the two movement axes 5, that is to say the motor for the horizontal movement x and the motor for the vertical movement y, are controlled from the start with a maximum speed movement sequence. Both motors therefore accelerate with maximum acceleration and run at full speed up to the end point of the respective movement sequence until they are stopped with maximum braking acceleration. Since in the present example the horizontal movement x can occur more quickly than the vertical lowering movement y, the motor of the horizontal movement x is stopped even while the lowering movement y is running. This results in the movement path 6 illustrated in FIG. 2.

Figure 3:
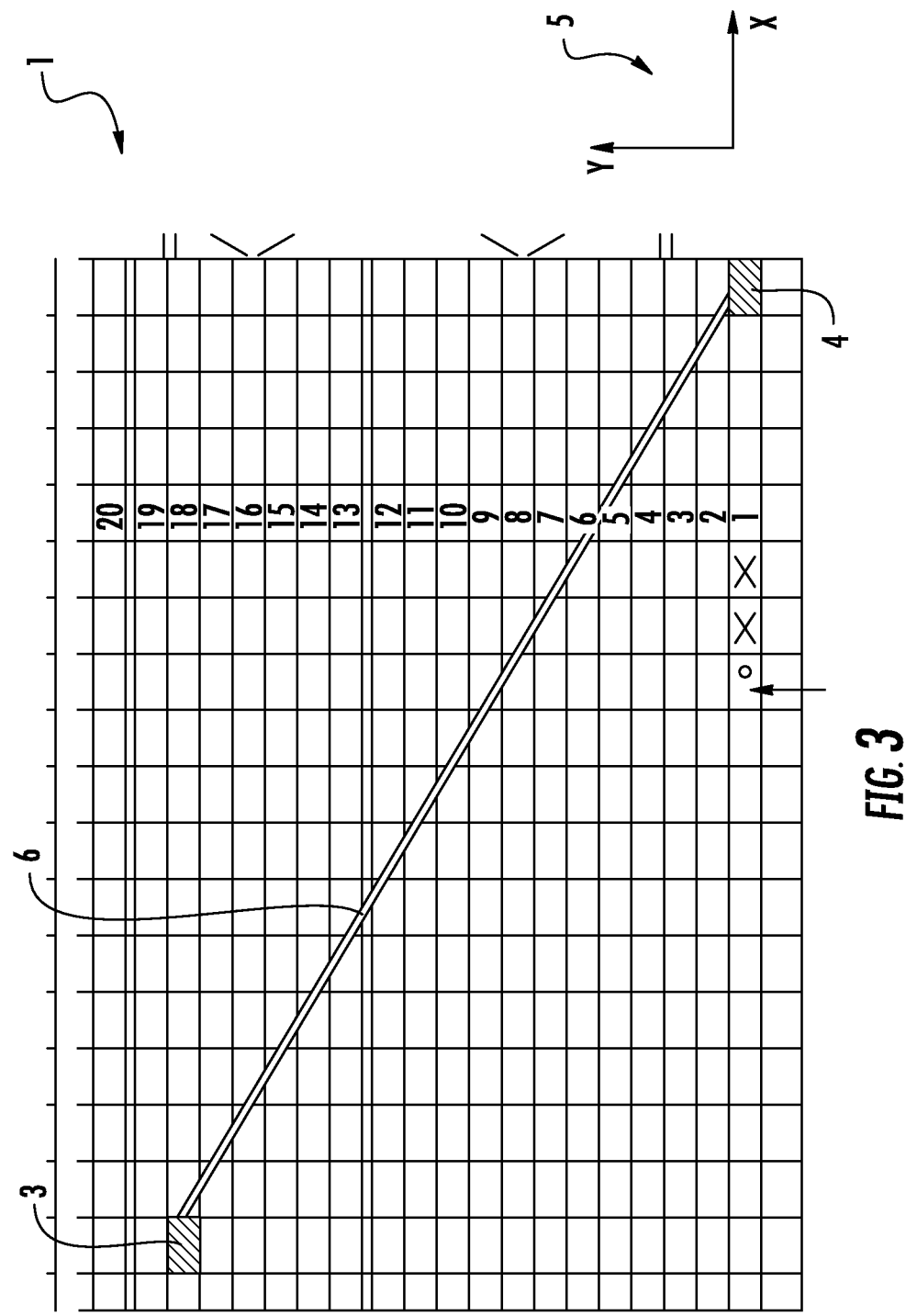
FIG. 3 shows a schematic illustration of a rack storage system with a second movement path.

A movement path 6 which is improved in terms of energy is illustrated in FIG. 3. Here, the time-critical movement axis, in the present example this is the vertical lowering movement y (cf. FIG. 2), is actuated with a maximum speed movement sequence, i.e. the corresponding motor of the storage and retrieval device is started immediately with maximum acceleration, operated with maximum speed and stopped at the target point 4 with maximum braking acceleration. The movement sequence of the movement axis for the horizontal movement x has, however, been coordinated with the movement sequence for the vertical movement y in such a way that a linear movement path 6, corresponding to the shortest connection between the starting point 3 and the target point 4, is produced. This means that the motor for the horizontal movement x is accelerated less strongly than in FIG. 2, operated at a lower speed and stopped with lower braking acceleration. It is obvious that the movement along the movement path 6 from FIG. 3 is as a result as fast as the movement along the movement path 6 in FIG. 2, but consumes less electrical energy, since the motor for the horizontal movement axis x is not actuated with a maximum speed movement sequence.

Figure 4:
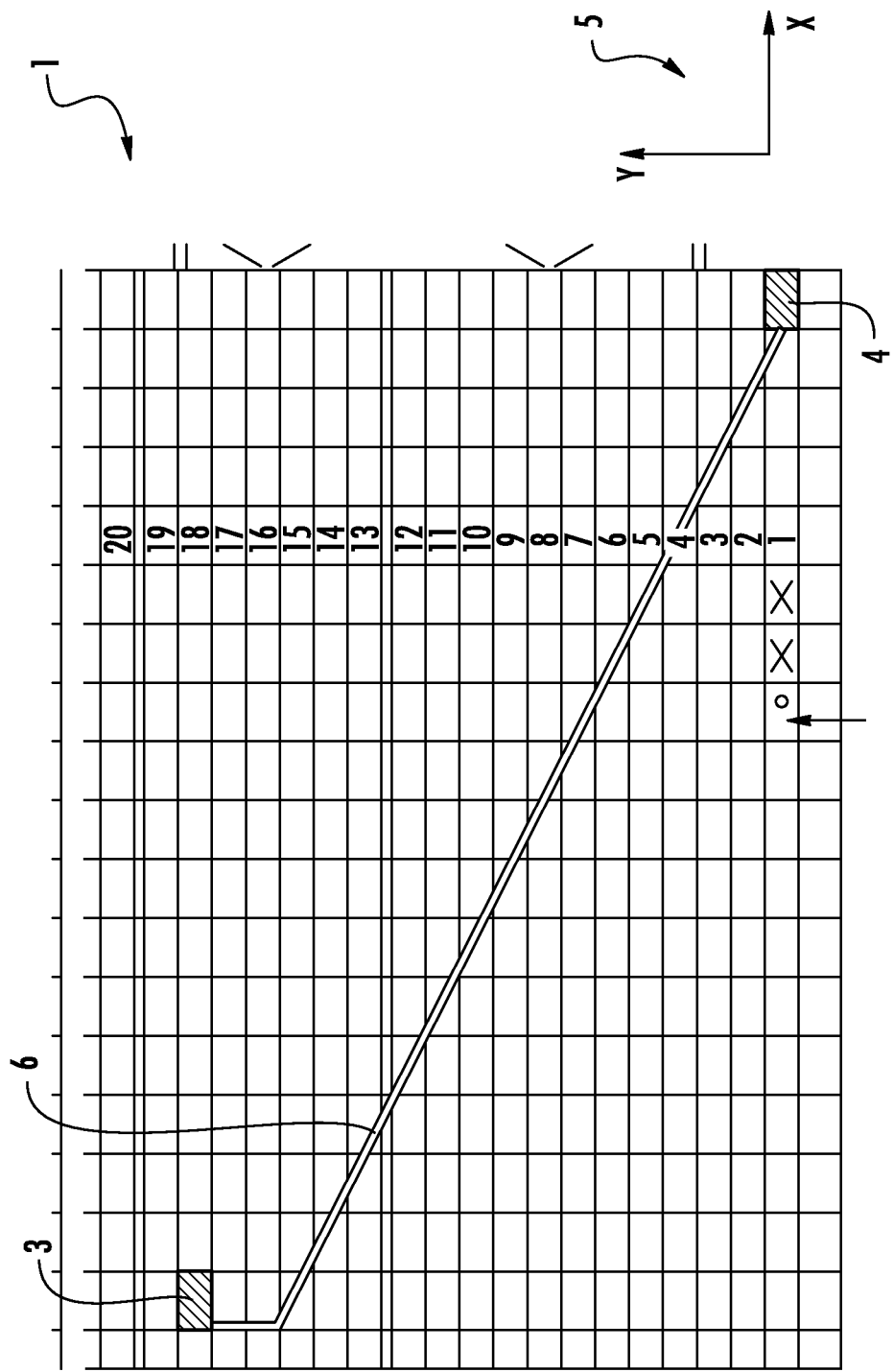
FIG. 4 shows a schematic illustration of a rack storage system with a third movement path.

FIG. 4 shows a movement path 6 between the starting point 3 and the target point 4 which is further energy-optimized compared to the movement paths 6 from FIG. 2 and FIG. 3. The time which is required to travel along the movement path 6 is still unchanged, since the motor for the vertical movement y continues to be controlled with a maximum speed movement sequence. However, the motor for the horizontal movement x starts up after a delay, to be precise only after the vertical lowering movement y has started. This provides the advantage that the motor for the horizontal movement x can be accelerated with the electrical energy which has been fed back from the motor for the vertical movement y; this is because the vertical movement y is in the present case a lowering movement, with the result that the corresponding motor is operated as a generator and feeds back electrical energy into the intermediate circuit.

If it is alternatively assumed in the exemplary embodiment according to FIG. 4 that the vertical lowering movement y can be carried out more quickly than the horizontal movement x, i.e. the horizontal movement axis x would in this case be the time-critical movement axis, the illustrated movement path 6 would correspond to the variant according to the invention in which, as a function of operation parameters of the rack storage system, a set of movement sequences is selected which results in a movement path 6 which requires a somewhat longer time than the movement path 6 illustrated in FIG. 3, but permits significant savings in energy. This would in turn be brought about by the fact that the movement axis x which is actually the time-critical one is started up after a delay after the starting of the motor of the movement axis y, in order to be able to use the electrical energy fed back from the motor of the movement axis y. According to the invention, the control system carries out this movement path 6 if either sufficient time is available in any case for the specific order of transferring stored goods from the starting point 3 to the target point 4, or if the benefit of a saving in energy outweighs the disadvantage of a longer movement.

Insofar as the vertical movement axis y is the time-critical movement axis (FIG. 2), FIGS. 3 and 4 show variants of the movement path 6 which are energy-optimized in a stepped fashion and with which electrical energy can be saved compared to the conventional prior art (FIG. 2), without extending the time required to travel along the movement path 6.

On the other hand, insofar as the horizontal axis x is the time-critical movement axis, the movement path 6 in FIG. 3 represents the high-speed operating mode according to the invention, while the movement path 6 according to FIG. 4 is an economical operating mode which is energy-optimized according to the invention.

The exemplary embodiments explained with reference to FIGS. 1 to 4 are merely intended to clarify the relationships according to the invention using simple examples. Of course, the invention is not restricted to such simple conditions.

The invention claimed is:
1. A rack storage system, comprising:
   a storage and retrieval device that moves along at least two movement axes;

the at least two movement axes including a first movement axis and a second movement axis, the first movement axis is an X axis and the second movement axis is a Y axis;
wherein the movement of the storage and retrieval device along the first axis is independently controllable of the movement along the second axis;
the movement of the storage and retrieval device along each of the first and second movement axes is operated by an independent electric motor for each of the axes;
the storage and retrieval device moves from a starting point to a target point for transferring stored goods to at least one of the following: within the rack storage system, into the rack storage system, or out of the rack storage system;
said rack storage system further includes;
a control unit that controls the motors of the storage and retrieval device along the first and second movement axes,
an electric intermediate circuit that exchanges fed-back electrical energy between the motors,
wherein the control unit is configured to:
    pre-calculate movement sequences of the individual movement axes that are required to move the storage and retrieval device from the starting point to the target point,
    coordinate the movement sequences of the individual movement axes with one another, and
    actuate the motors along each of the movement axes so that the storage and retrieval device moves along a pre-calculated movement path based on the set of the pre-calculated movement sequences of the individual movement axes,
the control unit is further configured to:
    calculate a plurality of sets of movement sequences that are coordinated with one another, wherein said plurality of sets of movement sequences contains at least:
        a first set comprising a high-speed operating mode, wherein in the high speed operating mode, the movement sequences are optimized with respect to a speed of the movement of the storage and retrieval device; and
        a second set comprising an economical operating mode, wherein in the economical operating mode, the movement sequences are at least partially optimized with respect to a consumption of electrical energy; and
the control unit is configured to select one of the plurality of sets of pre-calculated movement sequences based on the operation parameters of the rack storage system to actuate the motors of the storage and retrieval device to carry out a movement path (6).

2. The rack storage system as claimed in claim 1, wherein when the control unit pre-calculates the set of movement sequences that are optimized with respect to the speed of the storage and retrieval device in the high-speed operating mode, a maximum speed movement sequence is calculated for one of the movement axes,
said maximum speed movement sequence is based on a maximum speed of all the motors of the storage and retrieval device along each of the movement axes, and the maximum speed is determined by the speed of all or the motors requiring a longest time to carry out a movement sequence to move the storage and retrieval device from the starting point to the target point; and for the movement sequences that are calculated along the other of the movement axes, the movement sequences are coordinated with said one of the movement axis and include a shortest possible movement path.

3. The rack storage system as claimed in claim 1, wherein when the control unit is configured to pre-calculate the set of movement sequences that is optimized in a high-speed operating mode,
a maximum speed movement sequence is calculated for one of the movement axes based on a maximum speed of all the motors of the storage and retrieval device, and the maximum speed is determined by the speed of all of the motors requiring the longest time to complete a movement sequence to move the storage and retrieval device from the starting point to the target point;
wherein for the movement sequences that are calculated for movement of the storage and retrieval device along the other of the movement axes, the movement sequences along the other of the movement axes ends: before, or at the same time as, the movement sequence along the one of the movement axes, the one of the movement axes defines a time-critical movement axis for the storage and retrieval device and
wherein the correspondingly actuated motors require the least amount of electrical energy, or are operated with the least amount of wear on the motors as possible.

4. The rack storage system as claimed in claim 1, wherein when the control unit pre-calculates the set with the movement sequences in a high-speed operating mode,
a maximum speed movement sequence is calculated for one of the movement axes based on a maximum speed of all the motors of the storage and retrieval device, and the maximum speed is determined by the speed of all of the motors requiring the longest time to complete a movement sequence to move the storage and retrieval device from the starting point to the target point; and
wherein for the movement sequences that are calculated for movement along the other of the movement axes, the movement sequences along the other of the movement axes end: before, or at the same time as, the movement sequence of the one of the movement axes defines a time-critical movement axis; and
wherein acceleration processes of the associated motors are provided when electrical energy is fed back into the intermediate circuit from the motors of the movement axes.

5. The rack storage system as claimed in claim 1, wherein the control unit pre-calculates the set with the movement sequences which are optimized in an economical operating mode, acceleration processes of the motors assigned to the movement axes are provided when electrical energy is fed back into the intermediate circuit from the motors of the movement axes (5).

6. The rack storage system as claimed in claim 1, wherein the control unit is configured to calculate a quantity of sets of movement sequences which are coordinated with one another,
said quantity of sets further includes a third set with movement sequences that are optimized with respect to a wear of the storage and retrieval device and the motors, for a low-wear operating mode.

7. The rack storage system as claimed in claim 1, wherein during the selection of movement sequences, the control unit is configured to consider an instantaneous capacity utilization of the rack storage system.

8. The rack storage system as claimed in claim 1, wherein during the selection of the set of movement sequences, the control unit is configured to consider an instantaneous system state of the rack storage system, the control unit is further configured to determine whether stored goods that are transferred with the storage and retrieval device are to be passed on to a further handling system, and when said further handling system is ready to pick up the stored goods.

9. The rack storage system as claimed in claim 1, wherein the control unit is configured to take into account a delay during the selection of the set with the movement sequences,
wherein said delay is: pre-selectable or determined by a prediction algorithm,
when the control unit is configured to pre-calculate the movement sequences in the high-speed operating mode, the movement sequences are calculated for a time-critical axis such that the movement sequence is:
(1) slower than the maximum speed movement sequence by up to a value of the delay, or
(2) is started later by up to the value of the delay, or both, depending on a savings of electrical energy or a reduction in the wear of the storage and retrieval device and all of the motors.

10. The rack storage system as claimed in claim 1, said rack storage system further comprising a storage administration computer that is: connected to the control unit of the storage and retrieval device, or to the control units of a plurality of storage and retrieval devices; and
the storage administration computer is configured to initiate rearrangement of stored goods in operational pauses or interruptions as a function of:
(1) orders which have already been received, or
(2) predictions relating to a future capacity utilization of the rack storage system,
said storage administration computer initiates the rearrangement of the stored goods to optimize transportation paths of the rearranged stored goods with respect to expected movement sequences for the high-speed operating mode.

11. The rack storage system as claimed in claim 10, wherein
the storage administration computer is configured to balance an additional requirement for electrical energy for the rearrangement of the stored goods against possible savings with respect to electrical energy that is made possible by the rearrangement of the stored goods,
the storage administration computer further determines:
a number of the movement sequences which are likely to be carried out in the high-speed operating mode, and
the storage administration computer either initiates or suppresses the rearrangement of the stored goods based on the result.

12. A method for controlling the movement path of a storage and retrieval device that moves along at least two movement axes, the at least two movement axes include a first movement axis X and a second movement axis Y, and the movement of the storage and retrieval device along the first axis is independently controllable of the movement along the second axis, and the movement of the storage and retrieval device along each of the first and second axes is operated by an independent electric motor for each of the axes, the storage and retrieval device being movable from a starting point to a target point in a rack storage system which further includes a control unit that the motors of the storage and retrieval device along the first and second movement axes,
the method comprising the control unit:
pre-calculating movement sequences of the individual movement axes that are required for a movement from the starting point to the target point;
coordinating the movement sequences of the individual axes with one another; and
actuating the motors along each of the movement axes so that the storage and retrieval device moves along a pre-calculated movement path based on the set of the pre-calculated movement sequences of the individual movement axes;
calculating a plurality of sets of movement sequences that are coordinated with one another, wherein said plurality of sets of movement sequences contains at least:
a first set comprising a high-speed operating mode, wherein in the high-speed operating mode, the movement sequences are optimized with respect to a speed of movement of the storage and retrieval device; and
a second set comprising an economical operating mode, wherein in the economical operating mode, the movement sequences are at least partially optimized with respect to a consumption of electrical energy; and
selecting one of the plurality of sets of pre-calculated movement sequences based on operation parameters of the rack storage system to actuate the motors of the storage and retrieval device to carry out the movement path.

13. The method as claimed in claim 12, further comprising
the control unit pre-calculating the set of movement sequences that are optimized with respect to the speed of the storage and retrieval device in the high-speed operating mode, a maximum speed movement sequence is calculated for one of the movement axes,
said maximum speed movement sequence is based on a maximum speed of all the motors of the storage and retrieval device along each of the movement axes, and the maximum speed is determined by the speed of all of the motors requiring the longest time to carry out a movement sequence to move the storage and retrieval device from the starting point to the target point; and
for the movement sequences that are calculated along the other of the movement axes, the movement sequences are coordinated with the one of the movement axes and include a shortest possible movement path.

14. The method as claimed in claim 12, further comprising
the control unit pre-calculating the set with movement sequences that is optimized in a high-speed operating mode,
a maximum speed movement sequence is calculated for one of the movement axes based on a maximum speed of all the motors of the storage and retrieval device, and the maximum speed is determined by the speed of all the motors requiring the longest time to complete a movement sequence from the starting point to the target point;
wherein for the movement sequences that are calculated for movement of the storage and retrieval device along the other of the movement axes, the movement sequences along the other of the movement axes ends: before, or at the same time as, the movement sequence along the one of the movement axes, the one of the movement axes defining a time-critical movement axis for the storage and retrieval device; and wherein the correspondingly actuated motors require the least amount of electrical energy, or are operated with a least amount of wear on the motors as possible.

15. The method as claimed in claim 12, further comprising the control unit pre-calculating the set with movement sequences in a high-speed operating mode, calculating a maximum speed movement sequence for one of the movement axes based on a maximum speed of all the motors of the storage and retrieval device, requires the longest time for the necessary movement of the storage and retrieval device, and the maximum speed is determined by the speed of all the motors requiring a movement sequence to move the storage and retrieval device from the starting point to the target point; and wherein for the movement sequences that are calculated for movement along the other of the movement axes, the movement sequences along the other of the movement axes end: before, or at the same time as, the movement sequence of the one of the movement axes, the one of the movement axes defines a time-critical movement axis, and wherein acceleration processes of the associated motors when electrical energy is fed back into the intermediate circuit of the movement axes (5).

16. The method as claimed in claim 12, further comprising the control unit pre-calculating the set with movement sequences that are optimized in an economical operating mode, acceleration processes assigned to the movement axes are provided when electrical energy is fed back into the intermediate circuit from motors of the movement axes (5).

17. The method as claimed in claim 12, further comprising the control unit calculating a quantity of sets of the movement sequences that are coordinated with one another, said quantity of sets further includes a third set with movement sequences that are optimized with respect to a wear of the storage and retrieval device and the motors, for a low-wear operating mode.

18. The method as claimed in claim 12, further comprising the control unit considering an instantaneous capacity utilization of the rack storage system during the selection of movement sequences.

19. The method as claimed in claim 12, further comprising the control unit considering an instantaneous system state of the rack storage system during the selection of the set of movement sequences, the control unit further determining whether stored goods that are transferred with the storage and retrieval device are to be passed on to a further handling system, and when said further handling system is ready to pick up the stored goods.

20. The method as claimed in claim 12, further comprising the control unit considering a delay during the selection of the set with the movement sequences, wherein said delay is at least one of pre-selectable or determined by a prediction algorithm, the control unit pre-calculating the movement sequences in the high-speed operating mode, the movement sequences are calculated for a time-critical axis such that the movement sequence is:

(1) slower than the maximum speed movement sequence by up to a value of the delay, or (2) is started later by up to the value of the delay, or both, depending on a savings of electrical energy or a reduction in the wear of the storage and retrieval device and all the motors.

21. The method as claimed in claim 12, further comprising rearranging stored goods in the storage and retrieval device or a plurality of the storage and retrieval devices in operational pauses or operational interruptions as a function of:

(1) orders which have already been received or (2) predictions relating to future capacity utilization of the rack storage system, to optimize the transportation paths of the rearranged stored goods with respect to expected movement sequences for a high-speed operating mode.

22. The method as claimed in claim 21, further comprising balancing an additional requirement for electrical energy for the rearrangement of the stored goods against a possible savings with respect to electrical energy that is made possible by the rearranging of the stored goods, by predicting a number of the movement sequences which are likely to be carried out in a high-speed operating mode, and initiating or suppressing the rearranging of the stored goods depending on the result.

\* \* \* \* \*